US008628390B2

(12) United States Patent
Baltz et al.

(10) Patent No.: US 8,628,390 B2
(45) Date of Patent: Jan. 14, 2014

(54) SUPPORT SYSTEM FOR SEPARATOR GRATES OF A HARVESTER

(75) Inventors: Clinton T. Baltz, Lancaster, PA (US); Nathan E. Isaac, Lancaster, PA (US); Herbert M. Farley, Elizabethtown, PA (US); Wayne T. Flickinger, Oxford, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/428,489

(22) Filed: Mar. 23, 2012

(65) Prior Publication Data

US 2012/0270612 A1   Oct. 25, 2012

Related U.S. Application Data

(60) Provisional application No. 61/517,418, filed on Apr. 19, 2011.

(51) Int. Cl.
*A01F 12/28* (2006.01)

(52) U.S. Cl.
USPC ........................................................ 460/109

(58) Field of Classification Search
USPC ................. 460/109, 120, 107, 76, 79, 62, 46; 56/11.2, 11.3, 14.6; 29/428
See application file for complete search history.

(56) References Cited

U.S. PATENT DOCUMENTS

| 1,099,070 | A | * | 6/1914 | McConnell | 460/109 |
| 2,577,329 | A | * | 12/1951 | Irvine | 460/109 |
| 2,743,728 | A | | 5/1956 | Carlson | |
| 3,470,881 | A | | 10/1969 | Knapp et al. | |
| 3,568,682 | A | | 3/1971 | Knapp et al. | |
| 3,631,862 | A | * | 1/1972 | Rowland-Hill et al. | 460/109 |
| 3,734,103 | A | * | 5/1973 | Mathews | 460/108 |
| 3,957,058 | A | | 5/1976 | Komancheck | |
| 4,711,075 | A | * | 12/1987 | Strong | 460/120 |
| 4,711,252 | A | * | 12/1987 | Bernhardt et al. | 460/107 |
| 4,774,968 | A | * | 10/1988 | Spanlang | 460/109 |
| 5,024,631 | A | * | 6/1991 | Heidjann et al. | 460/75 |
| 5,489,239 | A | | 2/1996 | Matousek et al. | |
| 6,358,142 | B1 | * | 3/2002 | Imel et al. | 460/109 |
| 6,443,835 | B1 | | 9/2002 | Imel et al. | |
| 6,485,364 | B1 | * | 11/2002 | Gryspeerdt et al. | 460/107 |
| 6,485,365 | B2 | * | 11/2002 | Imel et al. | 460/119 |
| 6,503,142 | B2 | | 1/2003 | Imel et al. | |
| 6,530,833 | B2 | | 3/2003 | Imel et al. | |
| 6,758,745 | B2 | * | 7/2004 | Van Der Haegen et al. | 460/109 |
| 6,958,012 | B2 | * | 10/2005 | Duquesne et al. | 460/76 |
| 7,001,268 | B2 | | 2/2006 | Puryk et al. | |
| 7,393,274 | B2 | * | 7/2008 | Voss et al. | 460/109 |
| 8,133,100 | B2 | * | 3/2012 | Regier et al. | 460/109 |
| 8,133,101 | B2 | * | 3/2012 | Regier et al. | 460/109 |
| 2009/0233663 | A1 | | 9/2009 | Yanke et al. | |
| 2011/0151951 | A1 | * | 6/2011 | Regier et al. | 460/109 |

FOREIGN PATENT DOCUMENTS

JP       406276839 A    10/1994
WO    WO 0219795 A1  *  3/2002    ............. A01F 12/26

* cited by examiner

*Primary Examiner* — Árpád Fábián-Kovács
(74) *Attorney, Agent, or Firm* — Patrick M. Sheldrake (57) ABSTRACT

A support system for separator grates of a harvester includes a first member and a second member extending substantially parallel to an axis of rotation of a threshing rotor. The first member extends from a staging portion to a first support portion rearwardly positioned from the staging portion. The second member extends along a second support portion that corresponds to the first support portion. Separator grate segments may be selectably installed and removed from the first member and second member.

20 Claims, 11 Drawing Sheets

SUPPORT SYSTEM FOR SEPARATOR GRATES OF A HARVESTER

CROSS-REFERENCE TO RELATED APPLICATIONS

This application claims the benefit of U.S. Provisional Application No. 61/517,418, filed Apr. 19, 2011, which application is hereby incorporated by reference in its entirety.

FIELD OF THE INVENTION

The present invention is directed to rotary threshing systems for agricultural harvesters and, more particularly, to support systems for separator grates associated with threshing rotors in axial flow-type harvesters.

BACKGROUND OF THE INVENTION

Many agricultural harvesters, such as combines use a rotary threshing and/or separating system. The system typically includes at least one rotor drivingly rotated within a rotor housing including a perforated concave spaced radially outwardly thereof. The rotor will often have a frusto-conical inlet end having a helical flight or flights therearound for conveying a flow of crop material into a space between the rotor and the housing. The main body of the rotor will typically have an array or layout of threshing elements, typically rasp bars, which protrude radially outwardly therefrom into the space for conveying a mat of the crop material along a helical path through the space. Rasp bars cooperate with the concave to separate larger components of the crop, namely crop residue commonly referred to as straw, which includes stalks, stems, cobs and the like, from the smaller grain and material other than grain (MOG).

The concave typically includes grates that may either be maintained in a fixed position or movable in a radial direction with respect to a rotor rotational axis to provide adjustable clearance with respect to the rotor. Generally, concave grates near the front of the threshing rotor are adjustable and referred to as "threshing concaves", while the concave grates in the rear section are fixed in position and referred to as "separator grates". To the rear of the separator grates is the rotor discharge section. Installation and removal of the separator grates is difficult due to their weight, access to mounting hardware, and minimal operator access space between the separator grates and other components of the harvester.

Accordingly, there is a need for a support system that addresses the problems identified above. More specifically, there is a need for a support system that permits simplified installation and removal of separator grates from exterior of the harvester.

SUMMARY OF THE INVENTION

In accordance with one aspect of the present invention, a support system for separator grates of a harvester includes a first member and a second member extending substantially parallel to an axis of rotation of a threshing rotor. The first member extends from a staging portion to a first support portion rearwardly positioned from the staging portion. The second member extends along a second support portion that corresponds to the first support portion. The separator grate segment is installable from exterior of the harvester by directing one end of a separator grate segment into a sliding pivotal engagement with the staging portion of the first member. The separator grate segment rotates about the first member until the opposite end of the separator grate segment is axially aligned with the second member. The ends of the separator grate segment are slid along the first support portion of the first member and the second support portion of the second member to an installed position.

In accordance with another aspect of the present invention, a method of installing separator grates of a harvester includes providing a first member and a second member extending substantially parallel to an axis of rotation of a threshing rotor. The first member extends from a staging portion to a first support portion rearwardly positioned from the staging portion. The second member extends along a second support portion that corresponds to the first support portion. The method further includes directing one end of a separator grate segment into a sliding pivotal engagement with the staging portion of the first member. The method further includes rotating the separator grate segment about the first member until the opposite end of the separator grate segment is axially aligned with the second member. The method further includes sliding the ends of the separator grate segment along the first support portion of the first member and the second support portion of the second member to an installed position.

In accordance with still another aspect of the present invention, a method of removing separator grates from an installed position in a harvester includes providing a first member and a second member extending substantially parallel to an axis of rotation of a threshing rotor. The first member extends from a staging portion to a first support portion rearwardly positioned from the staging portion, and the second member extends along a second support portion that corresponds to the first support portion. At least one separator grate segment has opposed ends positioned in the installed position on the first support portion and the second support portion. The method further includes sliding the ends of the at least one separator grate segment along the first support portion of the first member and the second support portion of the second member to the staging portion. The method further includes sufficiently rotating the at least one separator grate segment about the first member to permit disengagement of the one end of the at least one separator grate segment from the first member. The method further includes removing the at least one separator grate segment from the harvester.

An advantage of the support system of the present invention is that it provides a staging portion to rotatably support a separator grate segment and permit axial alignment of the separator grate segment prior to installation of the separator grate segment on the support system, greatly simplifying such installation.

Another advantage of the support system of the present invention is that it prevents inadvertent removal of the separator grate segment from the harvester.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
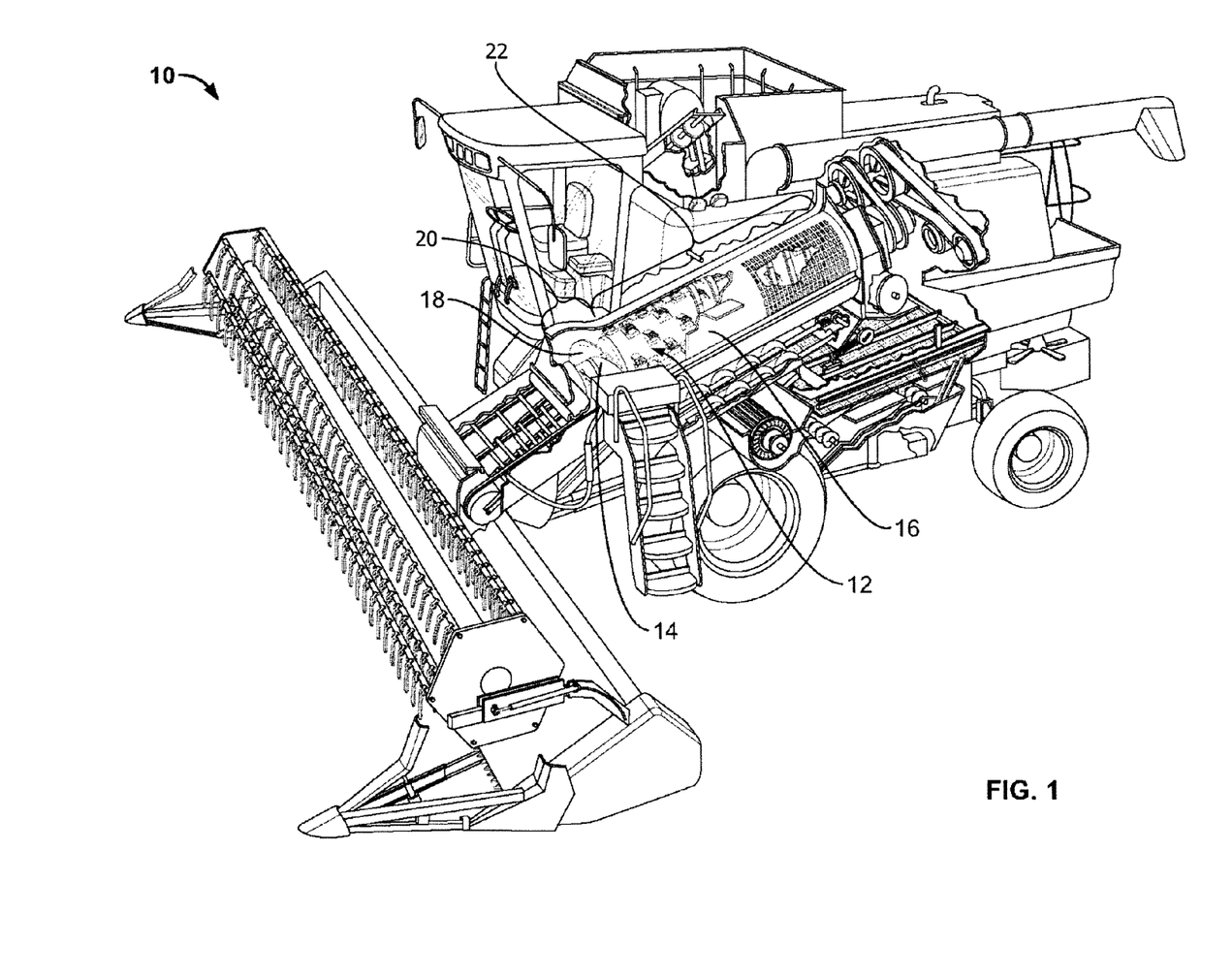
FIG. 1 shows a representative agricultural combine having a support system for a rotary threshing system of the present invention.
Figure 2:
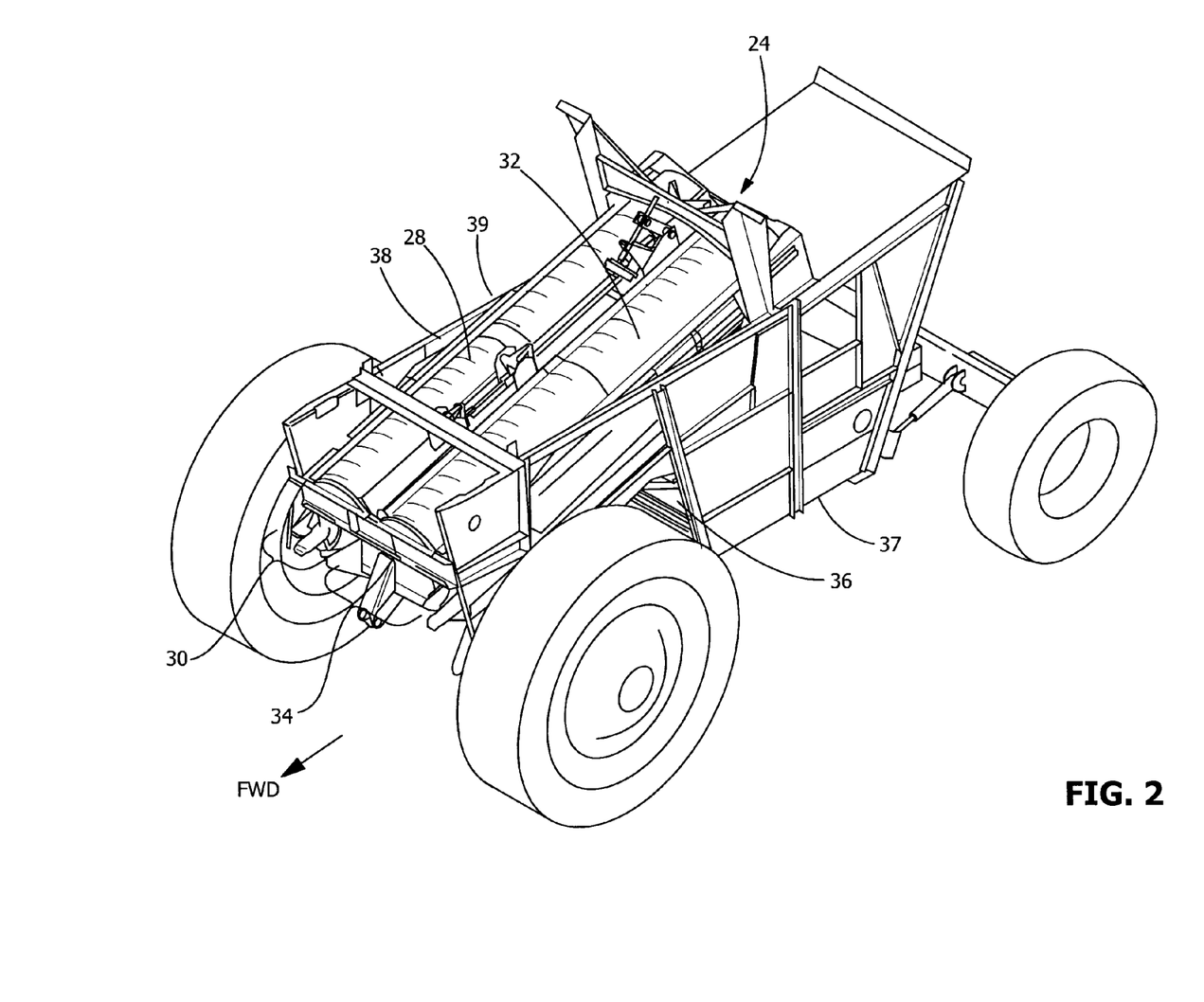
FIG. 2 is a partial cutaway view of a support system for a rotary threshing system of an agricultural combine of the present invention.

Turning now to the drawings, FIG. 1 depicts a representative agricultural harvester 10, such as a combine including a rotary threshing system 12 having a threshing rotor 14 in a rotor housing 16. Threshing rotor 14 includes an auger flight 18 at an infeed portion 20 to transfer crop material to a threshing/separating portion 22. Among other rotary threshing systems, an agricultural combine may have a rotary threshing system that includes only one threshing rotor (single rotor), as shown in FIG. 1, or a threshing system that has two counter-rotating threshing rotors (twin rotor). Agricultural harvester 10 is representative of an axial flow-type combine including one or two fore and aft extending threshing rotors, but it should be understood that it is contemplated that the invention can likewise be used with rotors of other types of combines, including, but not limited to, conventional types wherein one or more rotors of the invention will be mounted in a transverse orientation within a body of the combine.

Referring collectively to FIGS. 1-4, a twin rotary threshing system 12 of agricultural harvester 10 shows a rotor housing 32 associated with a left hand side rotor 34 and a rotor housing 28 associated with a right hand side rotor 30 having an axis of rotation 31. As further shown in FIG. 2, an opening 36 corresponds to a left hand side 37, and an opening 38 corresponds to a right hand side 39 for accessing components of the threshing system. As further shown in FIGS. 3 and 4, the threshing system further includes a support system 24 for supporting threshing concaves 25 and separator grates 26. Threshing concaves 25 are movable with respect to support system 24, and are installed and removed in a known manner along threshing concave support portion 23 that will not be further discussed herein.

Figure 3:
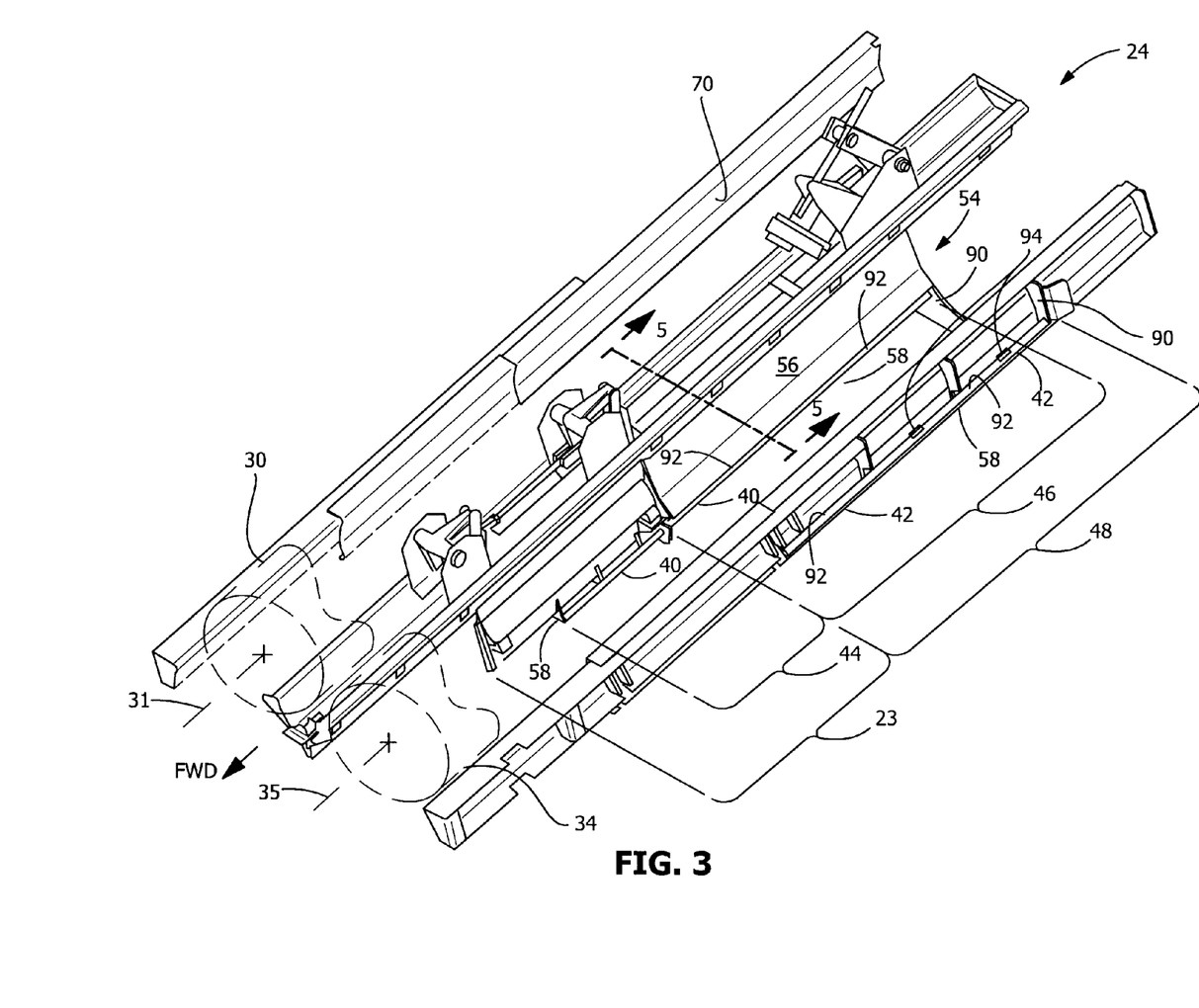
FIG. 3 is an upper perspective view of a support system of a threshing concave and a separator grate of an exemplary rotary threshing system of the present invention.
Figure 4:
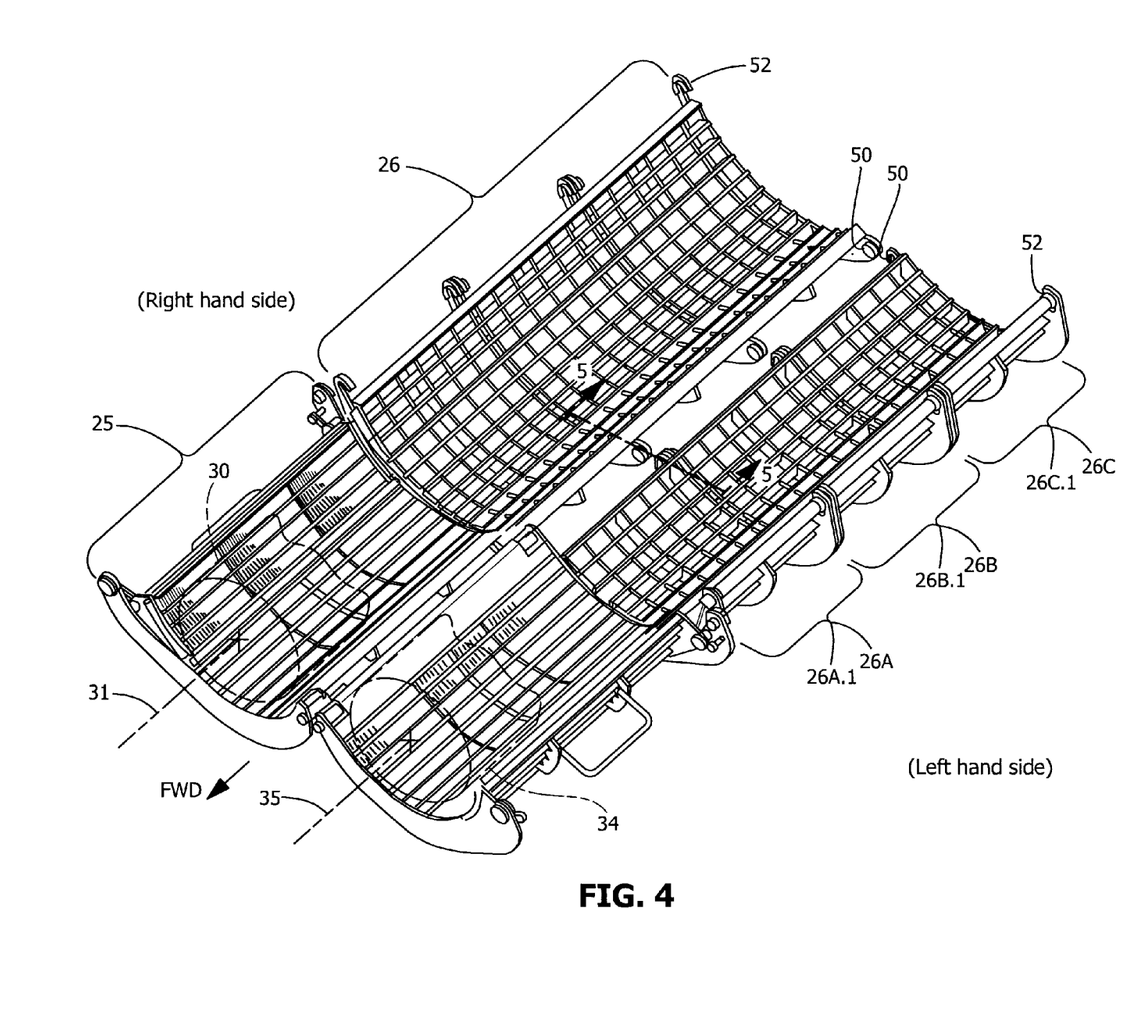
FIG. 4 is an upper perspective view of a threshing concave and a separator grate of an exemplary rotary threshing system of the present invention.

As further shown in FIGS. 3 and 4, separator grate 26 is a collection of a plurality of separator grate segments 26A, 26B, 26C that are shown in their respective installed positions 26A.1, 26B.1, 26C.1. Separator grate segments 26A, 26B, 26C each include opposed ends 50, 52 for engaging and being supported by a respective first member 40 and a second member 42 for each set of separator grates 26. That is, each side of the harvester frame of a twin rotor includes first member 40 and second member 42 for a corresponding set of separator grates 26 associated with each rotor. A harvester having a single rotor would likewise only need one first member 40 and second member 42 to support one set of separator grates 26.

Figure 5:
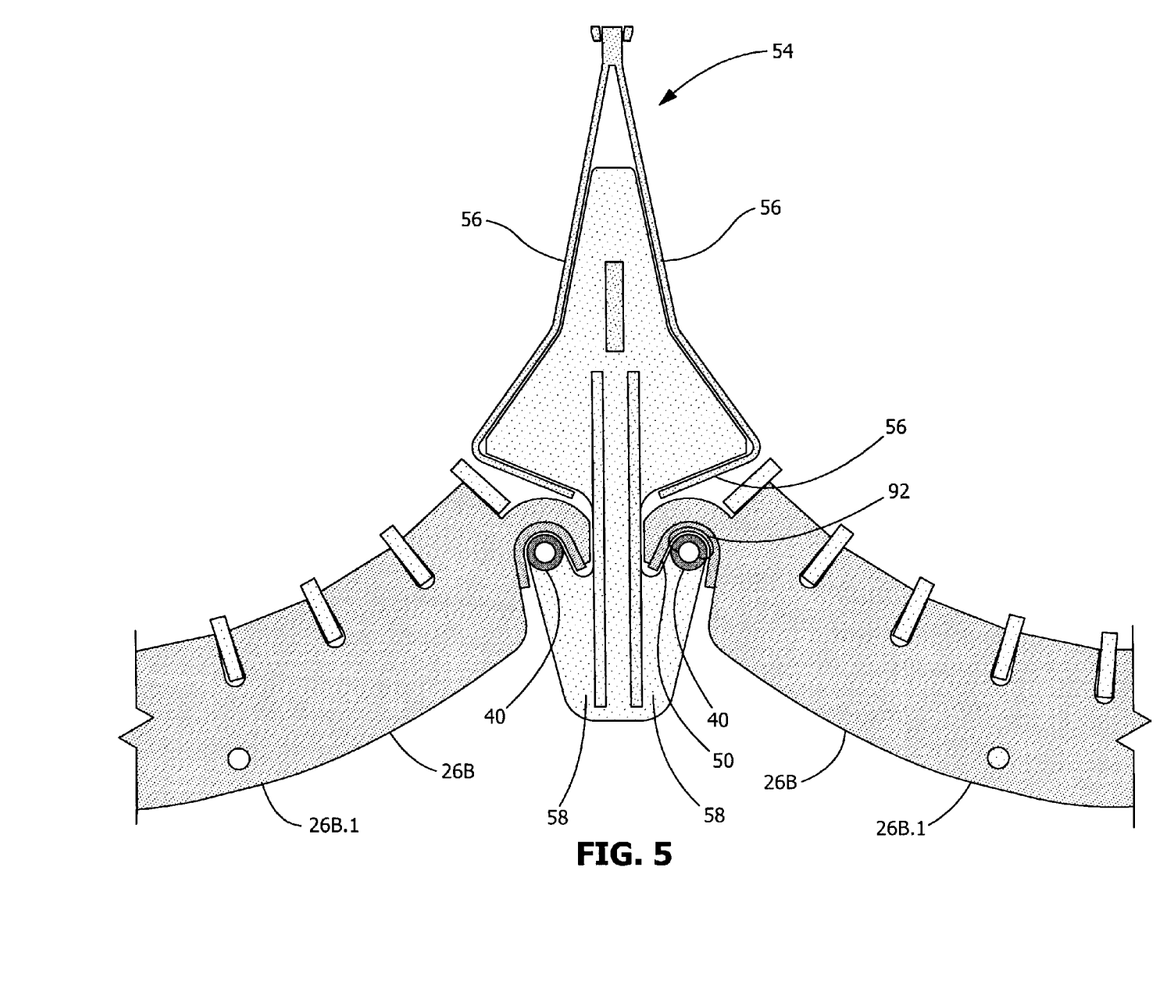
FIG. 5 is a cross section taken along line 5-5 of FIGS. 3 and 4 collectively showing an enlarged partial view of a center portion of a support system and a separator grate of the exemplary rotary threshing system of the present invention.
Figure 11:
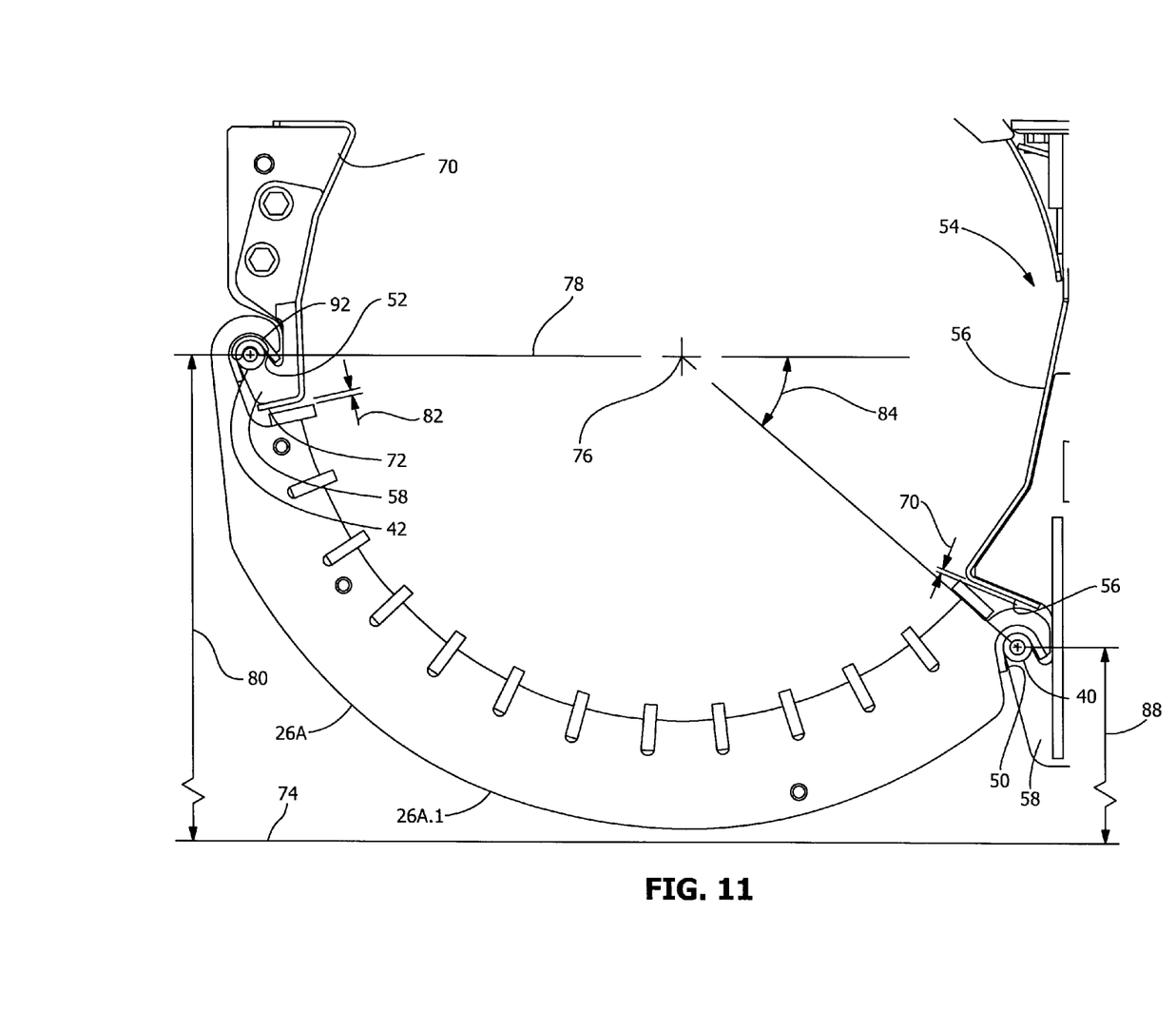
FIG. 11 is a cross section taken along line 11-11 of FIG. 9 of a rotary threshing system of an agricultural combine of the present invention.

As shown in FIG. 3, first member 40 and second member 42 include rails that extend substantially parallel to an axis of rotation 35 of thresher rotor 34. The rails of first member 40 and second member 42 are secured in position and supported by a plurality of J-shaped structures 58, such as shown in FIG. 5, which corresponds to a cross section of separator grate segment 26B in installed position 26B.1. As a result of the support from J-shaped structures 58, as shown in FIGS. 5 and 11, each of the rails of first member 40 and second member 42 provides a substantially continuous rail engagement surface 92 with corresponding ends 50, 52 of separator grate segments 26A, 26B, 26C. In one embodiment, at least a portion of the outer surface of at least one of the rails of first member 40 and second member 42 that engages ends 50, 52 of separator grate segments 26A, 26B, 26C has a low coefficient of friction. A low coefficient of friction associated with the rails could be as a result of the rails, for example, having a polished surface, the rail material having a low coefficient of friction without a polished surface, a layer of material (not shown) applied over the rails and having a low coefficient of friction, or any combination thereof. As further shown in FIG. 3, the rails could include rollers 94 to further reduce forces associated with axial movement of ends 50, 52 of separator grate segments 26A, 26B, 26C with respect to the rails of first member 40 and second member 42.

As shown in FIG. 3, first member 40 of support system 24 includes a staging portion 44 that is associated with both installation and removal of separator grate segments 26A, 26B, 26C. Rearward of staging portion 44 of first member 40 is a first support portion 46. Second member 42 includes a second support portion 48 that corresponds to first support portion 46. In other words, first support portion 46 of first member 40 and second support portion 48 of second member 42 are substantially parallel and longitudinally aligned with each other. Stated another way, a line transverse to first support portion 46 and coincident with a forwardmost end of first support portion 46 of first member 40 would also generally coincide with the forwardmost end of second support portion 48 of second member 42. Similarly, if the transverse line were moved to coincide with a rearmost end of first support portion 46, the transverse line would also generally coincide with the rearwardmost end of second support portion 48. As further shown in FIG. 3, the rails of each first member 40 and second member 42 include a stopping feature 90 to prevent separator grate segments 26A, 26B, 26C from inadvertently traveling rearwardly past installed position 26C.1 (FIG. 4). As will be discussed in more detail below, once separator grate segments 26A, 26B, 26C have been placed in their respective installed positions 26A.1, 26B.1, 26C.1, a head of a fastener 62 (FIG. 9) may be installed in second member 42 which acts as a stopping feature to prevent separator grate segments 26A, 26B, 26C from inadvertently traveling in a forward position past their respective installed positions 26A.1, 26B.1, 26C.1. In an alternate embodiment, the stopping feature could include a mechanical component, such as a cotter pin (not shown) that could be inserted through an opening formed near an end of first support portion 46 of first support member 40 or second support portion 48 of second support member 42. Other component arrangements may be utilized as stopping features.

Figure 6:
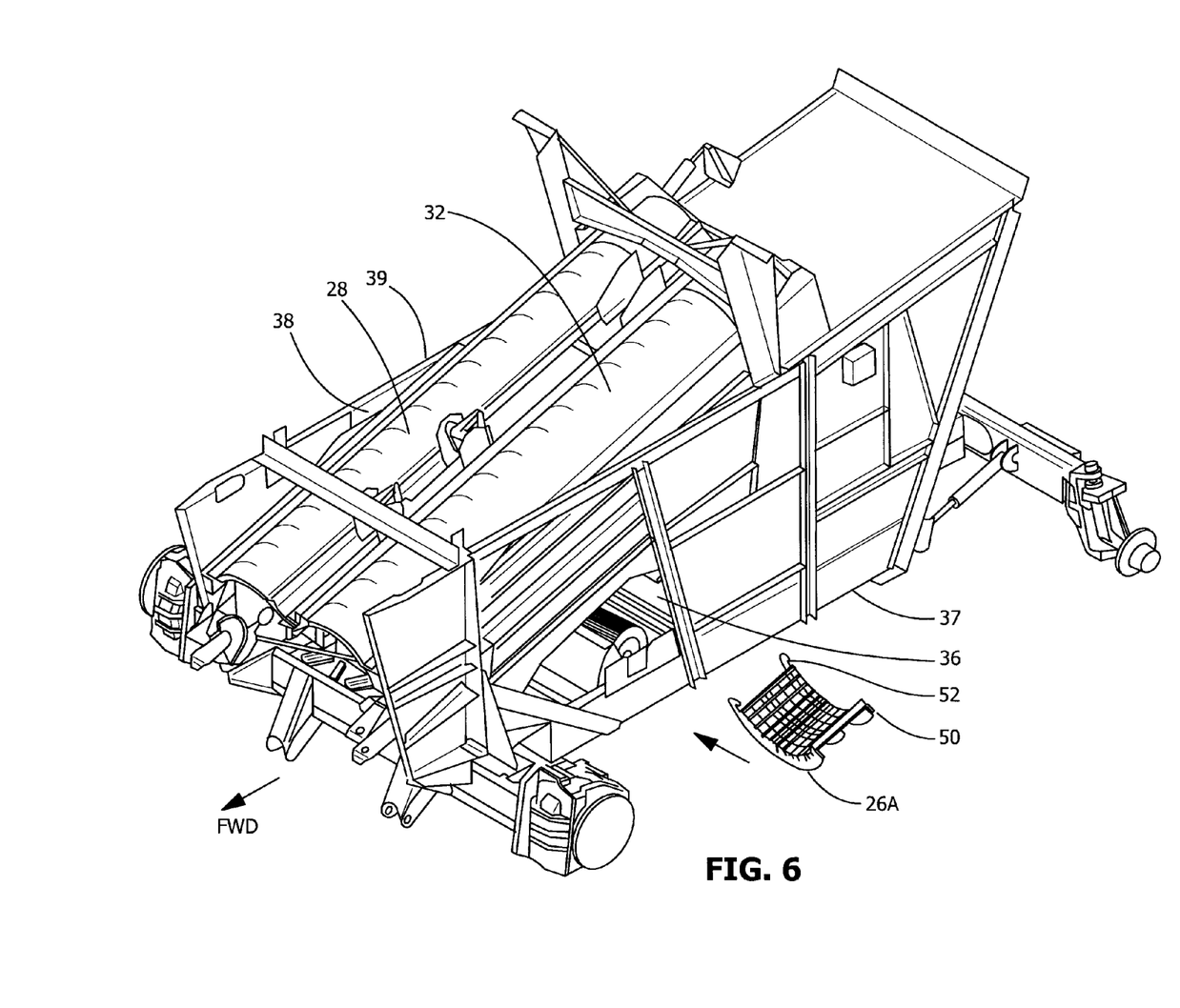
FIG. 6 is a partial cutaway view of a rotary threshing system of an agricultural combine prior to the installation of a separator grate segment of the present invention.
Figure 7:
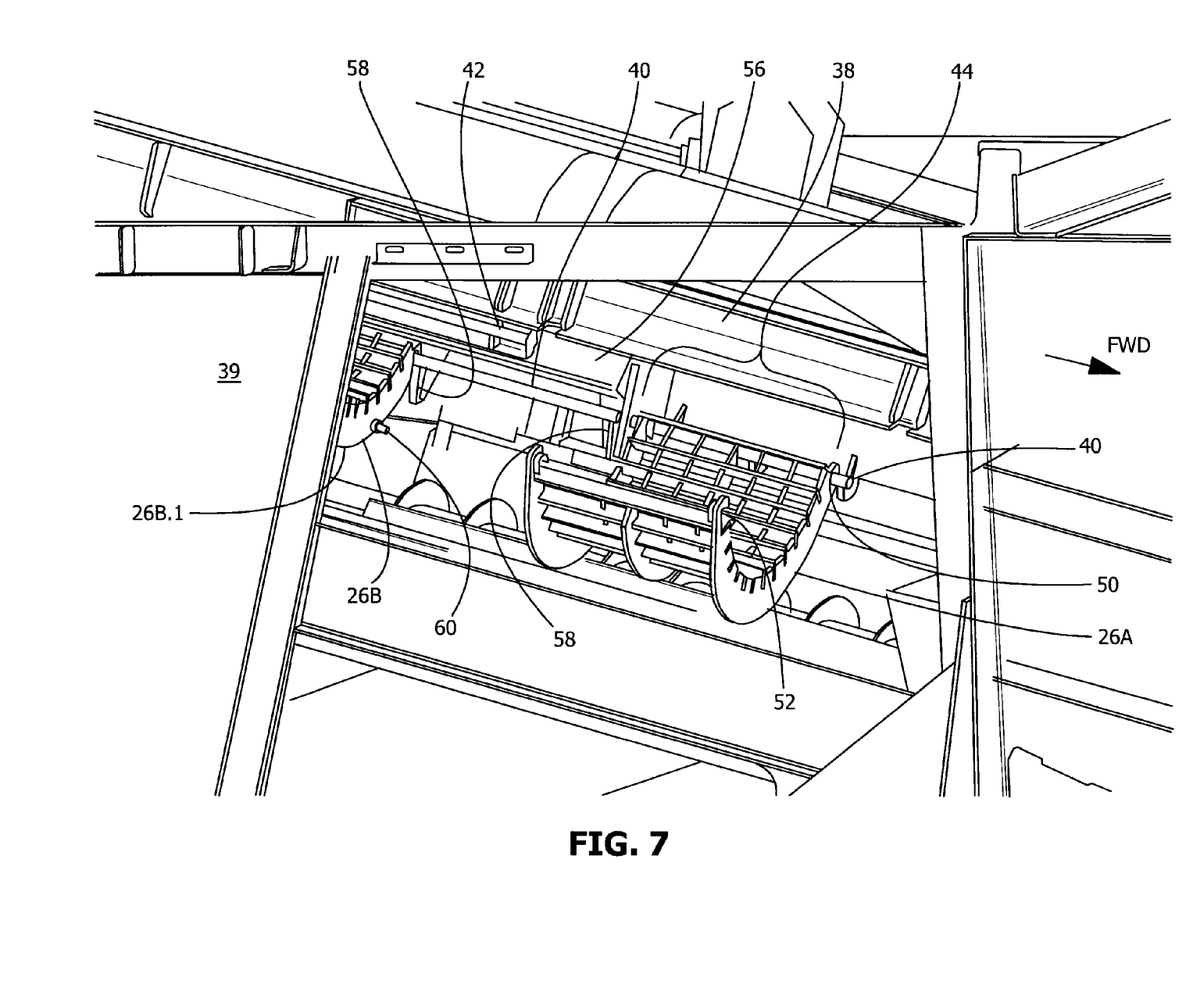
FIGS. 7-9 are enlarged partial reverse cutaway views with respect to FIG. 6 of a rotary threshing system of an agricultural combine showing multiple steps associated with the installation of a separator grate segment of the present invention.
Figure 8:
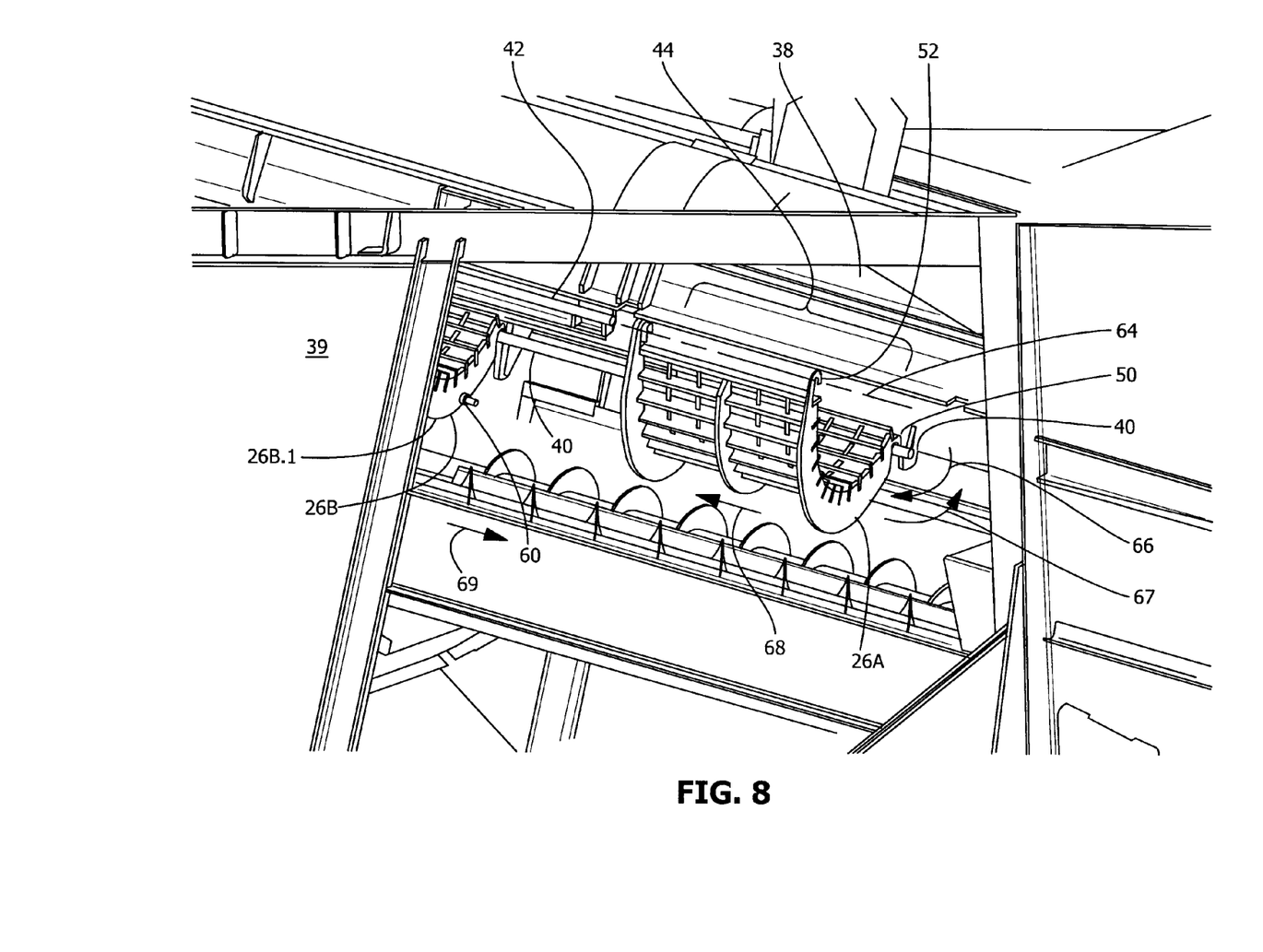
Figure 9:
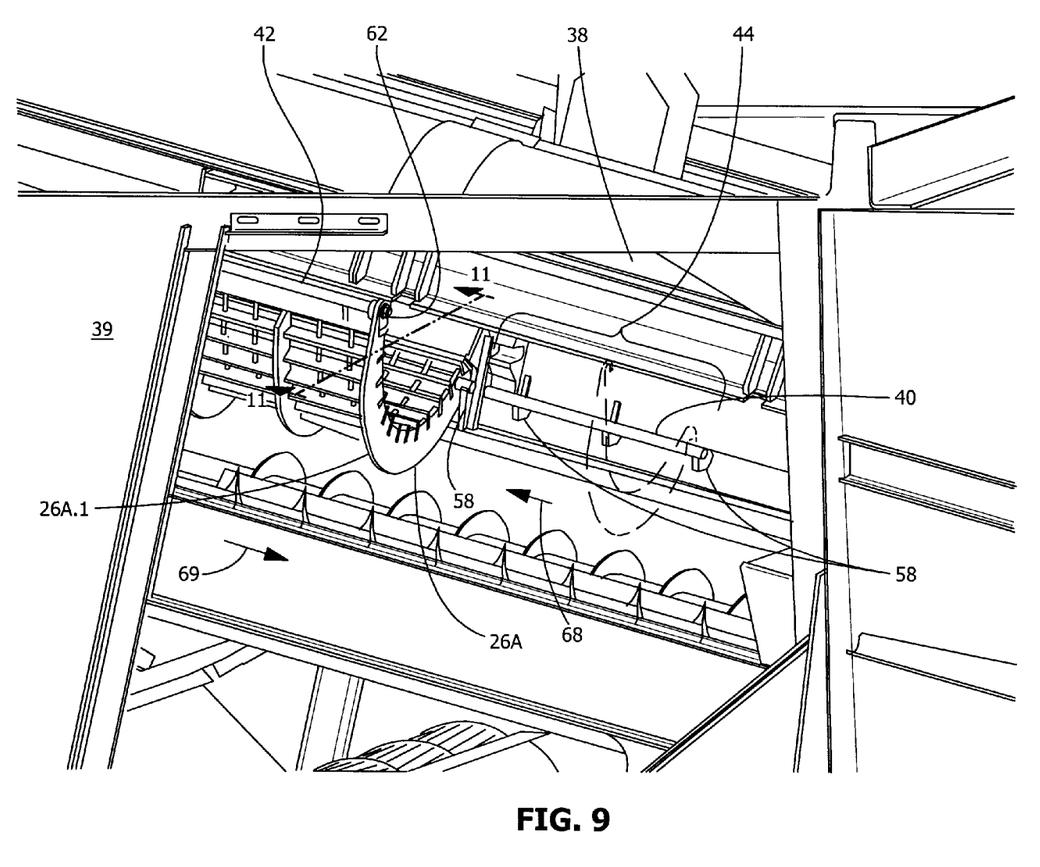

As a result of staging portion 44 of first member 40 extending forward of second member 42, one skilled in the art can appreciate that an end 50 of a separator grate segment 26A, for example, may be directed into a sliding pivotal engagement with staging portion 44 of first member 40. This is shown in FIGS. 6 and 7, in which end 52 of separator grate segment 26A is directed inside of opening 36 formed in left hand side 37 of the harvester structure. However, as can be shown in FIG. 4, if end 52 were inserted inside of the harvester from the left hand side, end 52 would need to be directed beneath and past rotor 34, to be installed onto the rails associated with rotor 30 located on the right hand side of the harvester structure. The vantage point of FIGS. 7-9 is through an opening 38 formed in right hand side 39 of the harvester structure, which is a reverse perspective view of FIG. 6. That is, FIGS. 7-9 show different stages of the installation of separator grate segment 26A onto the rails of first member 40 and second member 42 associated with the right hand side rotor 30 (FIG. 4).

Figure 10:
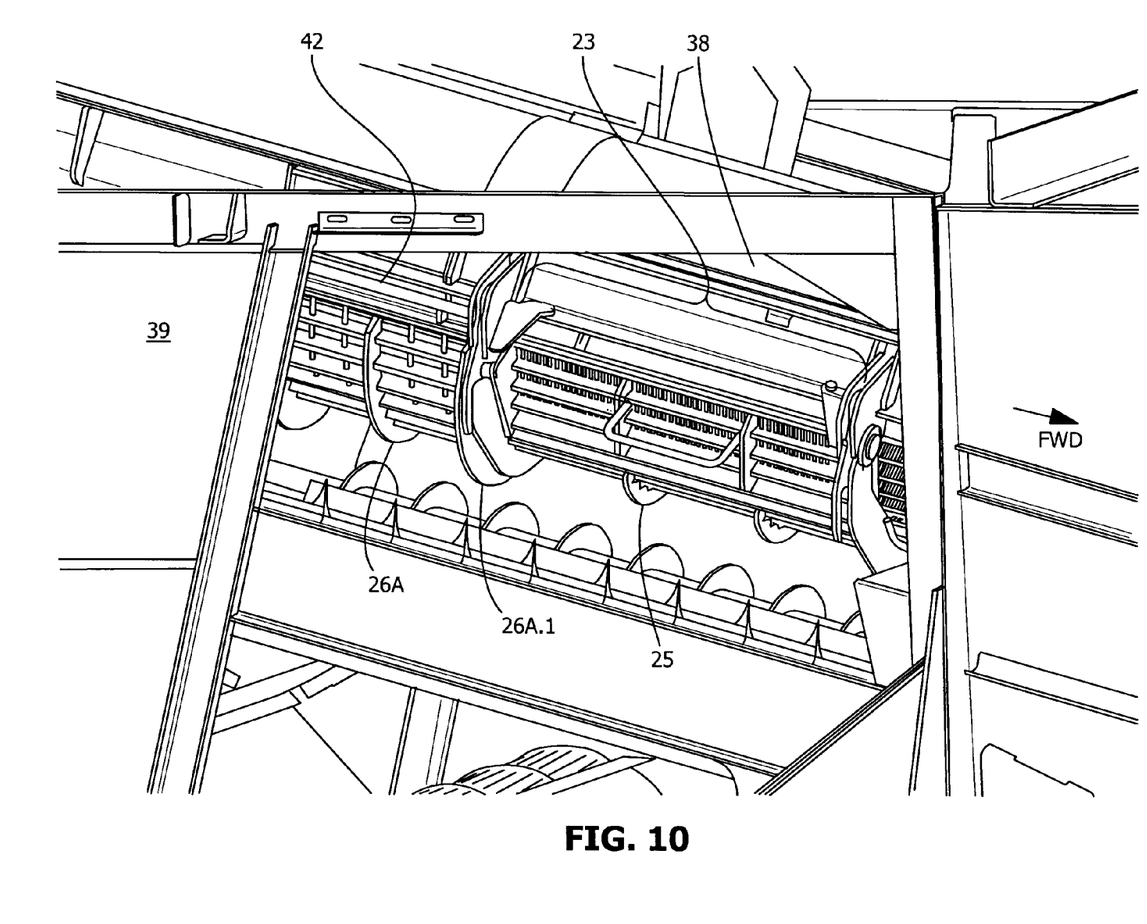
FIG. 10 is an enlarged partial reverse cutaway view with respect to FIG. 6 of a rotary threshing system of an agricultural combine showing an installed position of a separator grate segment and a threshing concave of the present invention.

As further shown in FIG. 7, pivotal engagement of end 50 of separator grate segment 26A and staging portion 44 of the rail of first member 40 is achieved. Once end 50 achieves engagement, as further shown FIG. 8, separator grate segment 26A is urged into a rotational movement 66 about the portion of the rail corresponding to staging portion 44 of first member 40 until end 52 of separator grate segment 26A is brought into alignment with axis 64 of the rail of second member 42. Once end 52 achieves alignment, as further shown in FIGS. 8-9, application of an axial force 68 to separator grate segment 26A that is parallel to the rails of first member 40 and second member 42 urges separator grate segment 26A into supported movement along the rails, until separator grate segment 26A reaches installed position 26A.1, after which a fastener 62 may be installed to prevent separator grate segment 26A from moving from its installed position 26A.1. FIG. 10 shows threshing concave 25 positioned in a threshing concave support portion 23 (also see FIG. 4 which shows the relative position of threshing concave 25 with respect to staging portion 44).

One skilled in the art can appreciate that to remove separator grate segment 26A, threshing concave 25 must first be removed, since threshing concave support portion 23 encompasses staging portion 44. Once threshing concave 25 is removed, and fastener 62 is removed, separator grate segment 26A may be removed by reversing the steps previously outlined for installation of separator grate segment 26A. That is, as shown in FIGS. 9-7, an axial force 69 opposite that of axial force 68 is applied to urge separator grate segment 26A into sliding movement from installed position 26A.1 and from supported movement along the rails of first member 40 and second member 42 until separator grate segment 26A reaches staging portion 44. Upon separator grate segment 26A reaching staging portion 44 of first member 40, separator grate segment 26A is urged into rotational movement 67, which is opposite rotational movement 66, sufficiently such that end 50 of separator grate segment 26A can be disengaged from first member 40 and subsequently removed from the harvester. In one embodiment, no rotational movement 67, or a minimal rotational movement 67, at most, may be required before end 50 can be disengaged from first member 40.

In the exemplary embodiment above, for separator grate segment 26A to be in installed position 26A.1, separator grate segments 26C and 26B would have already been placed in respective installed positions 26C.1 and 26B.1. Similarly, to remove separator grate segments 26C and 26B, separator grate segment 26B would need to be removed in a manner similar to that previously discussed for separator grate segment 26A, followed by removal of separator grate segment 26C. Conversely, to install separator grates 26, separator grate segment 26C would be installed in a manner similar to that described above for separator grate segment 26A. Upon installation of separator grate segment 26C, separator grate segment 26B would be installed, followed by installation of separator grate segment 26A.

In one embodiment, the separator grates 26 are interconnected to each other or to support structure, such as by a fastener 60, which could be a threaded fastener, or a dagger pin arrangement, in which the pin is inserted inside a corresponding opening when adjacent separator grate segments 26A, 26B, 26C are brought together, such as when adjacent separator grate segments are brought into respective installed positions 26A.1, 26B.1, 26C.1. Such interconnections prevent inadvertent disengagement of separator grate segments 26A, 26B, 26C from the rails of first member 40 and second member 42.

Alternately, as shown in FIG. 11, which is taken along line 11-11 from FIG. 9, the arrangement of structure surrounding opposed ends 50, 52 of separator grates 26 is shown. More specifically, as shown in FIG. 11 by separator grate segment 26A, the separator grates 26 are prevented from being inadvertently disengaged from the rails of first member 40 and second member 42, despite an absence of fasteners securing separator grate segments to each other or to a structural component of the harvester. That is, for example, in installed position 26A.1 of separator grate segment 26A, end 52 of separator grate segment 26A is slidably engaged with a rail of second member 42. It is readily apparent that surface 72 of panel 70 is positioned at a distance 82 from a portion of separator grate segment 26A that is much too small to permit disengagement of end 52 from the rail of second member 42. Similarly, it should also be readily apparent that outer surface 56 of divider 54 is positioned at a distance 86 from a portion of end 50 of separator grate segment 26A that is much too small to permit disengagement of end 50 from the rail of first member 40.

In one embodiment, the rail of first member 40 and second member 42 may be configured differently from each other such that only one of ends 50, 52 of separator grate segments 26A, 26B, 26C can engage first member 40. In another embodiment, the rail of first member 40 and second member 42 may be configured differently from each other such that only one of ends 50, 52 of separator grate segments 26A, 26B, 26C can engage second member 42. As used herein, the term configured differently may refer to a difference in shape, size or a combination of both, such that a single arrangement is required before assembly is possible between ends 50, 52 and a corresponding or mating rail of first member 40 and second member 42. That is, where separator grate segments 26A, 26B, 26C are not symmetric between opposed ends 50, 52, it would not be possible to inadvertently assemble a separator grate segments 26A, 26B, 26C in a manner different than intended. Stated another way, such an arrangement is sometimes referred to as a one-way assembly between opposed ends 50, 52 and separator grate segments 26A, 26B, 26C.

As further shown in FIG. 11, a rotor center 76 includes a substantially horizontal reference line 78 that extends through the rail of second member 42 such that a distance 80 separates the rail of second member 42 from a base surface 74, such as level ground. Conversely, an angle 84 separates horizontal reference line 78 from a line that extends through the rail of first member 40 such that a distance 88 separates the rail of first member 40 from base surface 74. In other words, in an exemplary embodiment, distance 80 and distance 88 are different from each other. However, in another embodiment, the distance between the rails of each of first member 40 and second member 42 and base surface 74 may be substantially the same.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A support system for a separator grate of a harvester comprising:
    a first member and a second member extending substantially parallel to an axis of rotation of a threshing rotor;
    the first member extending from a staging portion to a first support portion positioned adjacent the staging portion; and
    the second member extending along a second support portion that corresponds to the first support portion;
    wherein the staging portion extends beyond the length of the second support portion; and
    wherein the separator grate includes a separator grate segment installable from exterior of the harvester by directing one end of the separator grate segment into a sliding pivotal engagement with the staging portion of the first member, rotating the separator grate segment about the staging portion of the first member until the opposite end of the separator grate segment is axially aligned with the second member, and then sliding the ends of the separator grate segment along the first support portion of the first member and the second support portion of the second member to an installed position.

2. The system of claim 1, wherein the separator grate segment is removable from the installed position by sliding the ends of the separator grate segment along the first support portion of the first member and the second support portion of the second member to the staging portion, rotating the separator grate segment about the first member sufficiently to permit disengagement of the one end of the separator grate segment from the first member and removal of the separator grate segment from the harvester.

3. The system of claim 1, in combination with an axial rotor combine harvester wherein the rotor and axis of rotation of the rotor extends generally rearward with respect to the direction of travel of the harvester.

4. The system of claim 3, wherein the harvester has at least one adjustable concave mounted in a concave support portion and the first and second members extend at least rearward from the concave support portion, wherein the concave support portion encompasses the staging portion.

5. The system of claim 1, wherein once the separator grate segments are positioned in the installed position, fasteners directly connect the separator grate segments.

6. The system of claim 1, wherein the ends of the separator grate segments are prevented from being inadvertently disengaged from the first member and second member, despite an absence of fasteners securing the separator grate segments to each other or to a structural component of the harvester.

7. The system of claim 1, wherein at least one of separator grate segment has a hooked mounting portion shaped and configured to encompass at least half of at least one of the first and second mounting members for pivotal engagement therewith.

8. The system of claim 1, wherein the first member and the second member include stopping features to prevent the separator grate segments from inadvertently traveling rearwardly past the installed position.

9. The system of claim 1, wherein the length of the staging portion is generally equal to the length of the grate segment.

10. The system of claim 1, wherein the first member and the second member include a rail.

11. The system of claim 10, wherein the rail is supported by structure providing a substantially continuous rail engagement surface with the ends of the separator grate segments.

12. The system of claim 10, wherein J-shaped structure is secured to the rail.

13. The system of claim 10, wherein a distance between the rail of the first member and a base surface is different than a distance between the rail of the second member and the base surface.

14. The system of claim 10, wherein a distance between the rail of the first member and a base surface is substantially the same as a distance between the rail of the second member and the base surface.

15. The system of claim 10, wherein at least a portion of an outer surface of the rail of the first member and the second member that engages the separator grate segments has a low coefficient of friction.

16. A support system for a separator grate of a harvester comprising:
    a first member and a second member extending substantially parallel to an axis of rotation of a threshing rotor;
    the first member extending from a staging portion to a first support portion rearwardly positioned from the staging portion; and
    the second member extending along a second support portion that corresponds to the first support portion;
    wherein the separator grate includes a separator grate segment installable from exterior of the harvester by directing one end of the separator grate segment into a sliding pivotal engagement with the staging portion of the first member, rotating the separator grate segment about the first member until the opposite end of the separator grate segment is axially aliened with the second member, and then sliding the ends of the separator grate segment along the first support portion of the first member and the second support portion of the second member to an installed position;
    wherein the first member and the second member include a rail; and
at least one rail includes rollers.

17. A method of installing separator grates of a harvester comprising:
    providing a first member and a second member extending substantially parallel to an axis of rotation of a threshing rotor, the first member extending from a staging portion to a first support portion rearwardly positioned from the staging portion, and the second member extending along a second support portion that corresponds to the first support portion, wherein the staging portion extends beyond the first and second support portions with respect to the axis of rotation of the rotor;
    directing one end of a separator grate segment into a sliding pivotal engagement with the staging portion of the first member;

rotating the separator grate segment about the staging portion of the first member until the opposite end of the separator grate segment is axially aligned with the second member; and sliding the ends of the separator grate segment on to and along the first support portion of the first member and the second support portion of the second member to an installed position.

18. The method of claim 17, wherein a length of the staging portion is generally the length of the separator grate segment.

19. The method of claim 17, wherein the first member and the second member include a rail supported by structure providing a substantially continuous rail engagement surface with the ends of the separator grate segments, wherein the rail extends rearward parallel to the axis of rotation of the rotor rearward from a concave mounting portion of the harvester a majority of the length of the rotor.

20. A method of removing separator grates from an installed position in a harvester comprising:

providing a first member and a second member extending substantially parallel to an axis of rotation of a threshing rotor, the first member extending from a staging portion to a first support portion rearwardly positioned from the staging portion, and the second member extending along a second support portion that corresponds to the first support portion, at least one separator grate segment having opposed ends positioned in the installed position on the first support portion and the second support portion;

sliding the ends of the at least one separator grate segment along the first support portion of the first member and the second support portion of the second member to the staging portion wherein the separator grate disengages from the second support portion as it is slid from the first support portion to the staging portion, the staging portion extending beyond the first and second support portions with respect the axis of rotation of the rotor;

sufficiently rotating the at least one separator grate segment about the staging portion of first member to permit disengagement of the one end of the at least one separator grate segment from the first member;

removing the at least one separator grate segment from the harvester.

* * * * *